United States Patent

Murata

[11] Patent Number: 6,086,000
[45] Date of Patent: Jul. 11, 2000

[54] SHREDDER DUST TREATMENT PROCESS

[75] Inventor: Kozo Murata, Tokyo, Japan

[73] Assignee: Envitech Co., Ltd., Tokyo, Japan

[21] Appl. No.: 09/203,685

[22] Filed: Dec. 1, 1998

[30] Foreign Application Priority Data

Aug. 13, 1998 [JP] Japan .................................. 10-229079

[51] Int. Cl.⁷ .................................................. B02C 19/12
[52] U.S. Cl. .................. 241/19; 241/24.13; 241/DIG. 38
[58] Field of Search ......................... 241/DIG. 38, 24.13, 241/24.14, 24.15, 19

[56] References Cited

U.S. PATENT DOCUMENTS

| | | | |
|---|---|---|---|
| 4,036,441 | 7/1977 | Basten et al. ..................... | 241/DIG. 38 |
| 4,139,454 | 2/1979 | Larson ............................. | 241/DIG. 38 |
| 5,080,291 | 1/1992 | Bloom ............................. | 241/DIG. 38 |
| 5,301,881 | 4/1994 | Hayashi et al. .................. | 241/DIG. 38 |
| 5,443,157 | 8/1995 | Baker et al. ...................... | 241/DIG. 38 |
| 5,611,493 | 3/1997 | Hayashi et al. .................. | 241/DIG. 38 |

*Primary Examiner*—Mark Rosenbaum
*Attorney, Agent, or Firm*—Finnegan, Henderson, Farabow, Garrett & Dunner, L.L.P.

[57] ABSTRACT

A preferred shredder dust treatment process which includes: (1) a step of executing a first crushing; (2) a step of separating and recovering metals from the first crushed product; (3) a step of a second crushing; (4) a step of separating and recovering metals from the second crushed product; (5) a step of executing a third crushing; (6) a step of collecting and recovering dust and the like by fluidizing the third crushed product to separate therefrom a fluffy dust and pneumatically transporting the separated fluffy dust to a dust collector; and (7) a step of separating and recovering non-ferrous metals, non-metals, and the like, from the third crushed product. Preferably, the shredder dust is crushed by crushers having square blades.

7 Claims, 4 Drawing Sheets

SHREDDER DUST TREATMENT PROCESS

BACKGROUND OF THE INVENTION

1. Field of the Invention

The present invention relates to a process for treating shredder dust and separating and recovering valuable materials for recycling. It further relates to a process for crushing shredder dust, separating and recovering valuable metal and non-metal materials, and submitting them to resource recycling.

2. Description of the Related Art

The term "shredder dust" is a general name for the non-metallic refuse residues from crushed material from automobiles, home appliances, and the like produced by a crusher mainly comprising a hammer mill, followed by removing removable metals from the crushed product. When automobiles, home appliances, and the like are fed into a hammer mill, rotating circular rotors with hammers crushes the automobiles, home appliances, and the like, and discharge disintegrated metal and non-metal pieces from a grid beneath the crusher. The size of the crushed material differs depending upon the opening sizes of the grid beneath the crusher but is commonly about 75×110 mm to 100×200 mm, in general, oblong-shaped.

The crushed material can be generally classified into 4 types: 1) light waste, the components collected and accumulated by a dust collector; 2) a ferrous component separated and accumulated by a magnetic drum or the like; 3) a non-ferrous waste, that is non-ferrous metals, such as aluminum, copper, lead etc., separated, recovered, and accumulated by an automatic non-ferrous separator, such as STEINERT separators NE 50/NE 150, which function according to the eddy-current principle; and 4) heavy waste, that is a separated and accumulated stainless steel and heavy dust components which are inseparable by an automatic non-ferrous separator. Among these, the combination of 1) light waste and 4) heavy waste is shredder dust.

The shredder dust heretofore has been disposed of by such methods as 1) hauling it as collected to a controlled disposal facility for discarding; 2) shaping and compacting it into a cylindrical form by a twin-screw compactor and transporting it to a disposal facility for discarding; 3) storing it on the company site; 4) compressing it by a press machine and packaging the shredder dust using vinyl tape to be stored on the company site; or 5) subjecting it to the recovery of the metals by an incinerator equipped with a dry still furnace, thereby combusting the shredder dust and using the heat of combustion generated for power generation and so on. From among these methods, the combustion-power generation disposal process 5) is not presently used much and the shredder dust is commonly discarded at disposal facilities.

However, the shredder dust, which is disposed of in this manner, still contains about 10–15% by weight of stainless steel or like metal and about 10–15% by weight of inorganic oxides such as silica, alumina, and the like; and these valuable materials are currently disposed of as waste. It is a challenge for the future in terms of waste disposal and resource recycling to further recover the valuable materials from shredder dust and to reduce the load on the final disposal facility. In terms of waste treatment and resource recycling, automobiles and home appliances among type 1 designated products of the Disposal and Recycle Law of Japan are positioned to be the main pillars of a recycle system construction. In this aspect as well, retreatment of shredder dust and reuse of resources is an important subject.

PROBLEM TO BE SOLVED BY THE INVENTION

Since the retreatment of shredder dust containing valuable materials has lacked a commercial level of treatment technology, the shredder dust is currently discarded to disposal facilities as obtained. Not only is such valuable material not recycled by being discarded leading to resource waste, but it also adds to the loads on disposal facilities in terms of waste disposal.

SUMMARY OF THE INVENTION

The present inventors have aimed at providing a shredder dust retreatment process, thereby making it possible to recycle these resources and to reduce the loads on final disposal facilities.

According to the present invention, a shredder dust treatment process comprises crushing shredder dust and recovering valuable materials. The shredder dust treatment process comprises the following steps: 1) a step of executing a first crushing; 2) a step of separating and recovering metals from the first crushed material; 3) a step of a second crushing; 4) a step of separating and recovering metals from the second crushed material; 5) a step of executing a third crushing; 6) a step of separating and recovering non-ferrous metals, non-metals, and the like, from the third crushed product; and 7) a step of collecting and recovering dust and the like. A shredder dust treatment process comprises crushing by a crusher having square blades. The process of separating and recovering metals from the first crushed product comprises the following steps: 1) A step of separating recovering steel by a hanging magnet; 2) A step of separating recovering steel by a magnetic drum; 3) A step of separating and recovering non-ferrous metals by a non-ferrous separator; and 4) A step of separating and recovering metals using a metal detector. For feeding the shredder dust or its comminuted material, use is made of a steel conveyor having alternately mounted slab-like protrusions. In feeding the shredder dust or its crushed product, a feeder is equipped with a hood to prevent the overflow of the contents and a detector sensor which detects an abnormal content level. In the step of separating and recovering non-ferrous metals, non-metals, and the like, from the third crushed product, part of the separated components of said crushed product is returned to the third crushing step.

The present invention is based on crushing shredder dust and separating and recovering valuable material therefrom. Shredder dust can be particularly efficiently crushed by a crusher having square blades. Crushing the shredder dust by means of square blades is an important element in the separation and recovery of valuable materials from the shredder dust. The main valuable materials, which are separated and recovered, are metals. The present invention for treating shredder dust adequately removes cable covering material such as polyvinyl chloride, and the like, which could cause dioxin generation, so that the collected material as a dust can also be used for a second combustion material such as in solid fuel and the like.

Since shredder dust is crushed, the lifetime of the blades which is the essence of the crusher is an important practical problem. What governs the blade lifetime is the presence of metal in the dust. In order to provide a long blade life for the crusher and to efficiently separate and recover the valuable materials, the present invention comprises treatment steps, which comprise a clever combination of crushing and metal separation steps. Furthermore, in such a waste disposal treatment, in general, the mechanical devices tend to be jammed by materials, making it presently difficult to carry out a stable, continuous operation of the equipment. By taking such an aspect into consideration, the present invention involves an improvement in the device used, particularly in terms of the shape of a metering feeder and a stable feed circuit.

Explanation of symbols are:

| | |
|---|---|
| 1: | Crusher; |
| 3: | Constant rate feeder; |
| 5: | Rotor blade; |
| 7,11: | Square blades; |
| 12 | Stationary blade; |
| 13 | Lower grid; |
| 14 | Vibrating screen; |
| 16 | Mounting hole; |
| 31 | Hopper; |
| 32 | Duct connecting tube; |
| 33 | Conveyor chamber; |
| 34 | Conveyor; |
| 35 | Protrusion; |
| 36 | Motor; |
| 37 | Detector sensor; |
| 38 | Hood. |

DESCRIPTION OF THE PREFERRED EMBODIMENTS

Figure 1:
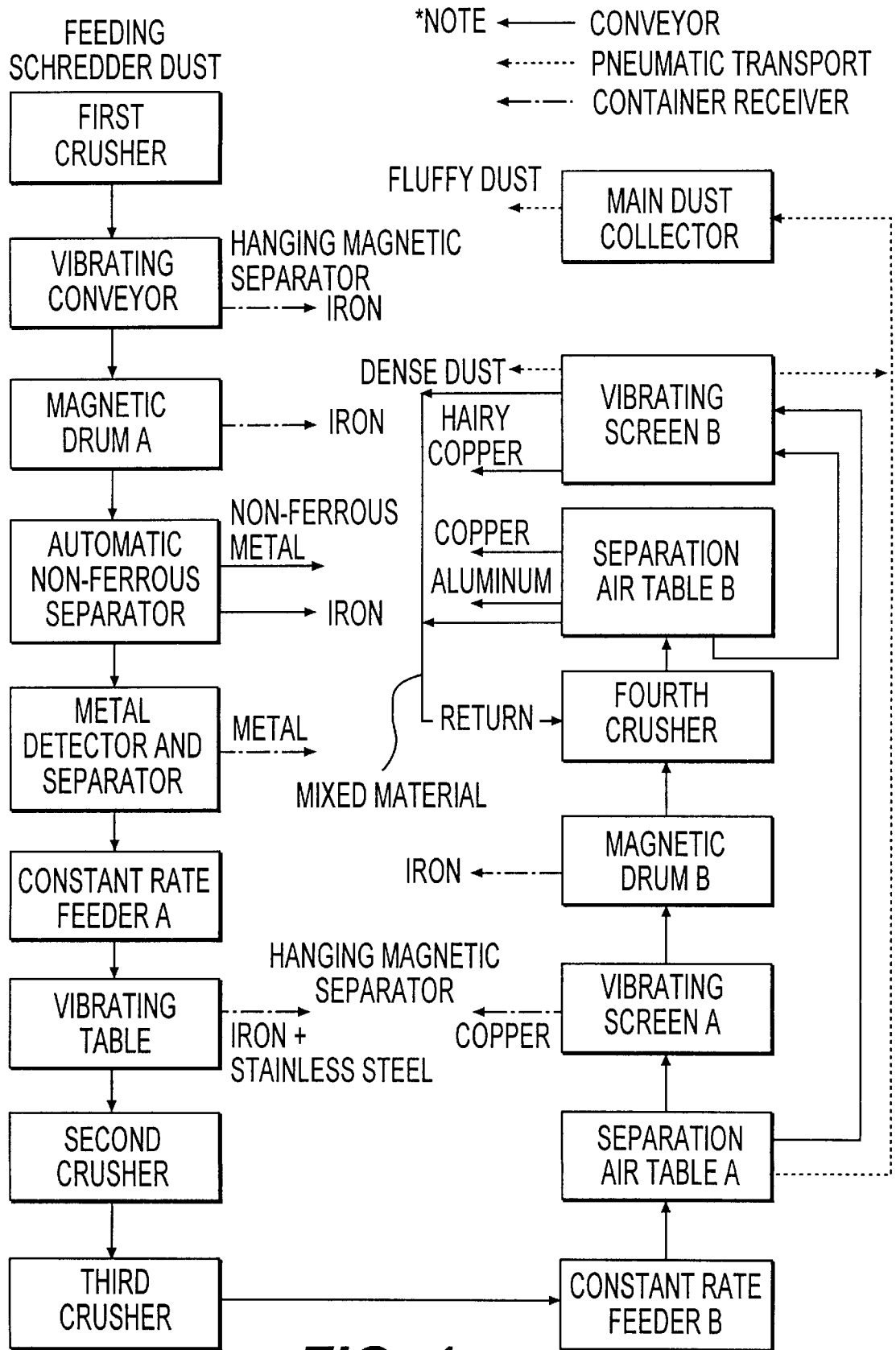
FIG. 1 is a block diagram illustrating an example of the embodiment of this invention.
Figure 2A:
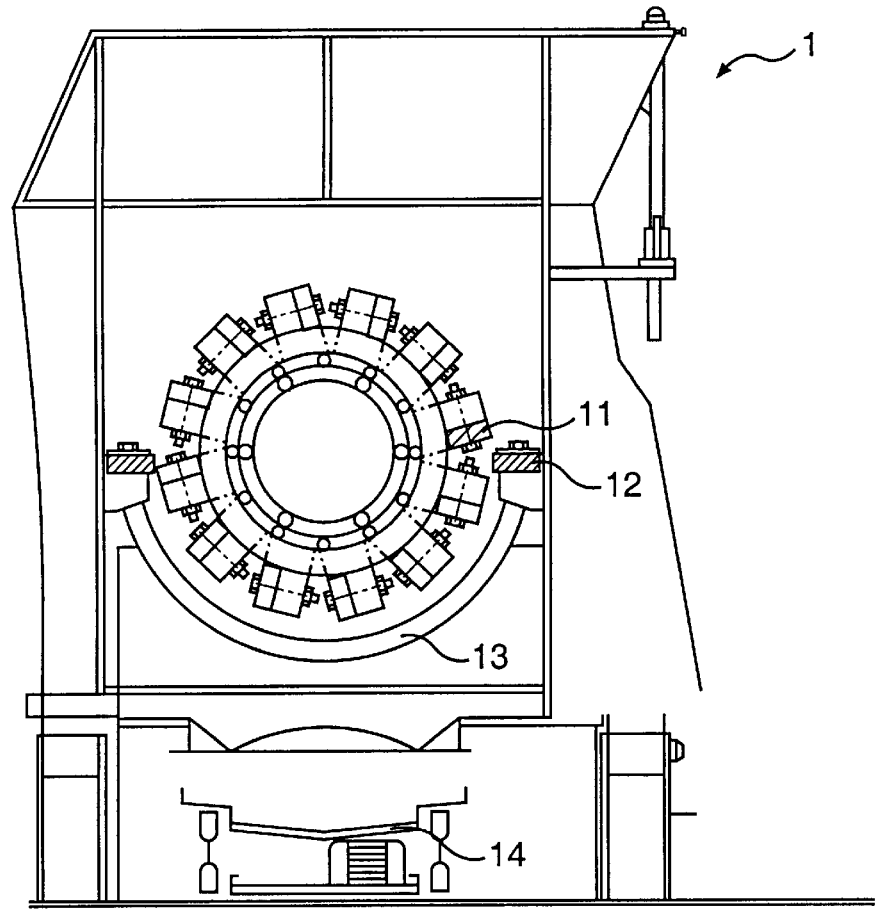
FIGS. 2a and 2b are diagrams illustrating a crusher.
Figure 2B:
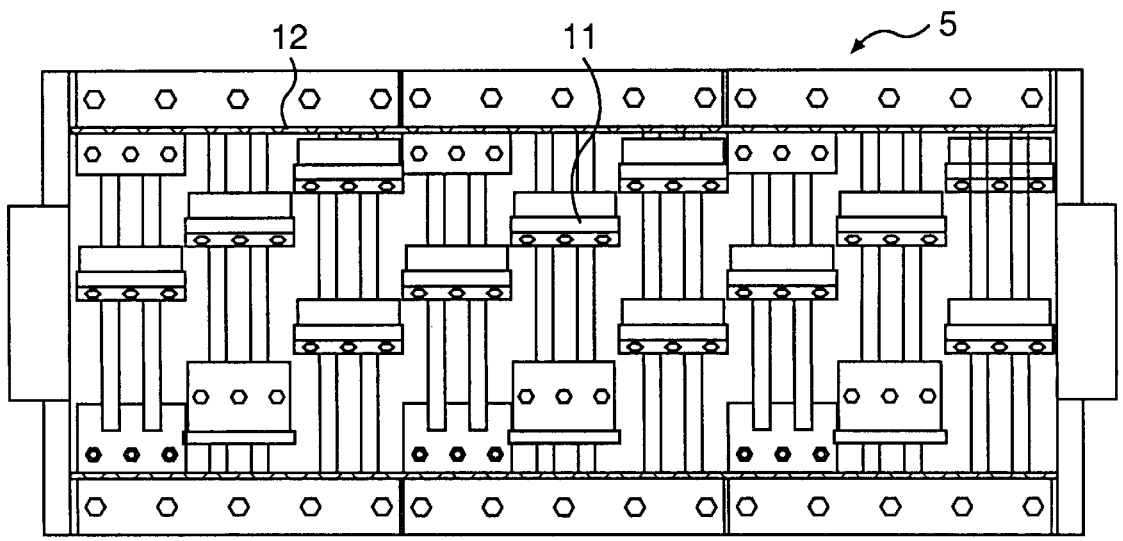

The present invention is now described on the basis of the embodiments given below. FIG. 1 is a block diagram illustrating an example of the embodiment of this invention although the present invention is not necessarily limited to this embodiment. The shredder dust is fed first into a first crusher. The shredder dust is a crushed material from automobiles and home appliances, which is mixed with clothing strips, wood, glass, pebbles, and metal, and it cannot be efficiently crushed by a commonly known crusher such as a hammer mill or the like down to the size which permits sorting. The material must be crushed in a mode resembling more like cutting. The present invention uses a type of crusher that has square blades, which is used to comminute copper wire in cables, but may not be familiar to the scrap industry. The main parts of the crusher are illustrated in FIGS. 2a and 2b. FIG. 2(a) is a side view; FIG. 2(b) is a drawing illustrating a rotor blade portion.

Figure 3:
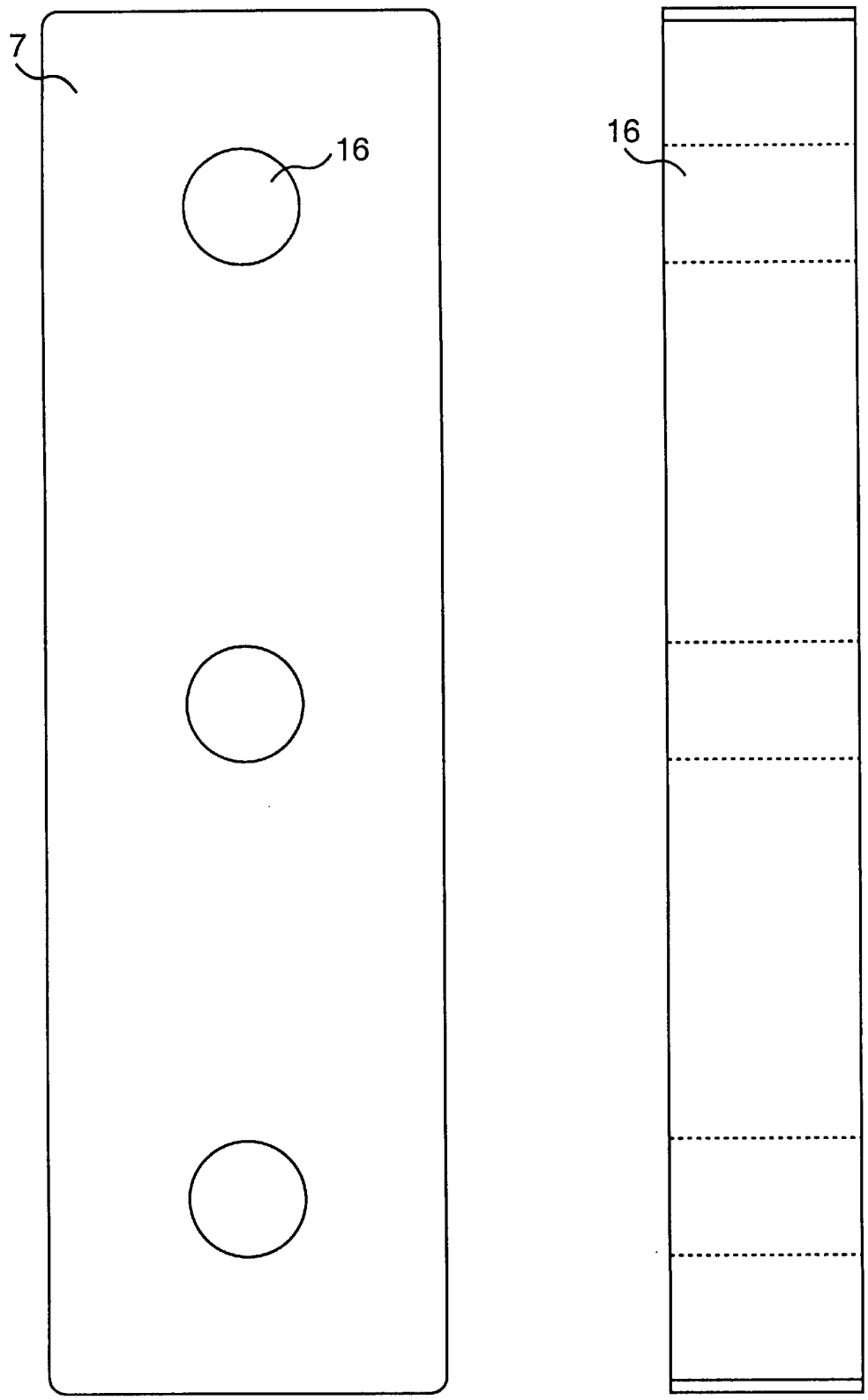
FIG. 3 is a diagram illustrating a square blade.

In crusher 1, the rotating cylinder is equipped with square blades 11 for cutting. As illustrated in FIG. 2(b), square blade 11 is slab-like, that is, oblong, and is attached to the crusher cylinder in a staggered manner and faces stationary blade 12. Underneath the rotating blades is provided a lower grid 13. The blade itself is illustrated in FIG. 3. Square blade 7 is oblong and its four faces are cutting surfaces. By varying the position to which the blade is attached, one can use all 4 edges or 4 faces of the same blade. Crushing of shredder dust using a crusher having these square blades can efficiently separate and recover valuable materials from the crushed shredded dust product.

Shredder dust, when finely crushed, permits recovery of valuable metals and the like materials for recycling. Since there has been no way to finely comminute shredder dust, the dust as obtained, has had to be disposed of at final disposal stations. For a fine crushing of shredder dust, a first crushing by a first crusher alone is insufficient, requiring second and third crushings. In this embodiment, the first crushing is carried out by a first crusher, the second crushing by using two crushers, a second crusher and a third crusher; the third crushing by a fourth crusher.

The size of the crushed material should be reduced in a stepwise manner. The crushed particle size depends on the opening size of the lower grids mounted underneath the rotor to which crusher blades are attached. In the first crusher, the opening size of the lower grid is 30–35 mm; the second crusher has a lower grid with 12–14 mm openings; the third crusher has a lower grid with a 7–9 mm openings. By having the particle size of the crushed material from the third crusher be 7–9 mm, one can particularly efficiently separate a variety of valuable metals and the like. The number of crushings and the particle size at each crushing are optimumly selected from a result of trial and error runs.

The metal separation after the first crushing must be carried out thoroughly; this is for the protection of the blades of the second crusher and the succeeding ones. The opening size of the grid below the blade for the latter is made smaller in order to reduce the particle size of the crushed material, but this means an extensive wear of the crusher blade. Therefore, after the first crushing has been executed, the system must separate out the metals with care.

A metal separation after the first crushing is carried out by separating and recovering iron using a hanging magnetic separator and a magnetic drum A. Then the separation and recovery of metal is carried out by means of a metal detector. This is a metal separator, which is a combination of a metal detector and a gas ejector. When the metal detector detects metal, a gas such as air is ejected form a nozzle to blow away said metal.

When stainless steel is crushed, cracks are generated therein to cause its structure to transform from austenite to martensite, which begins to respond to magnetic forces. This principle is used to separate stainless steel from the shredder dust crushed material. For this, for example, a neodymium type 3500 gauss or higher, hanging magnetic separator is used. The hanging magnetic separator is provided above a vibrating table which is installed after constant rate feeder A so as to separate both stainless steel and iron. Up to now it has been substantially impossible to separate stainless steel from shredder dust, but the separation of stainless steel has been made possible for the first time by having the shredder dust pass through such an additional crushing step.

The crushed product obtained by the first crusher is placed on a vibrating conveyor provided beneath the first crusher. The crushed material is transported while being vibrated on the vibrating conveyor to a magnetic drum A. A hanging magnetic separator is provided above said vibration conveyor and separates the iron. The remaining crushed material is transported by a conveyor to the magnetic drum A where its magnetic force further separates the iron. The crushed material is then transported to an automatic non-ferrous separator. The automatic non-ferrous separator has plurality of magnets mounted on the drum in such a way so that north poles and south poles thereof are alternately being exposed, where the non-ferrous metals and iron are separated using the principle of an eddy current.

The crushed material leaving the automatic non-ferrous separator is transported by a conveyor to a metal separator which is a combination of a metal detector and a gas ejector. When metal is detected, a gas is ejected from a nozzle to blow off from the conveyor any residual metal such as stainless steel and the like, for separation. The crushed material is then transported by the conveyor to a constant rate feeder A. From this constant rate feeder A, the crushed material is fed in a nearly constant rate to the steps below.

Beneath the constant rate feeder A is installed a vibrating table, where the stainless steel and iron contained in the crushed material leaving the exit of the feeder are separated by a hanging magnetic separator with a powerful magnetic force provided over the vibration table. The crushed product leaving the vibrating table is then transported to the second and third crushers. As described above, the openings in the lower grid of the first crusher should be 30–35 mm, the openings in the lower grid of the second crusher should be 12–14 mm, and those in the lower grid of the third crusher should be 7–9 mm. The second crusher cannot completely remove the covering material from covered copper wire; but substantially complete removed is achieved when it is passed through the third crusher.

Figure 4A:
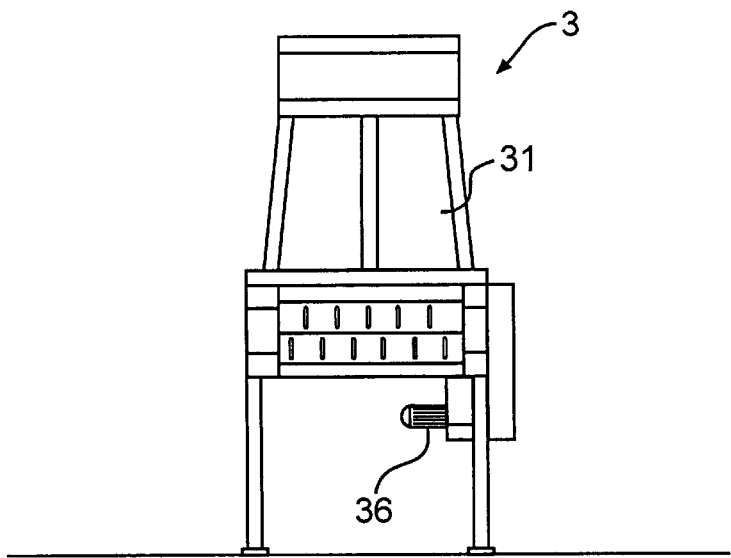
FIGS. 4a, 4b, and 4c are diagrams illustrating a feeder of constant feed rate.
Figure 4B:
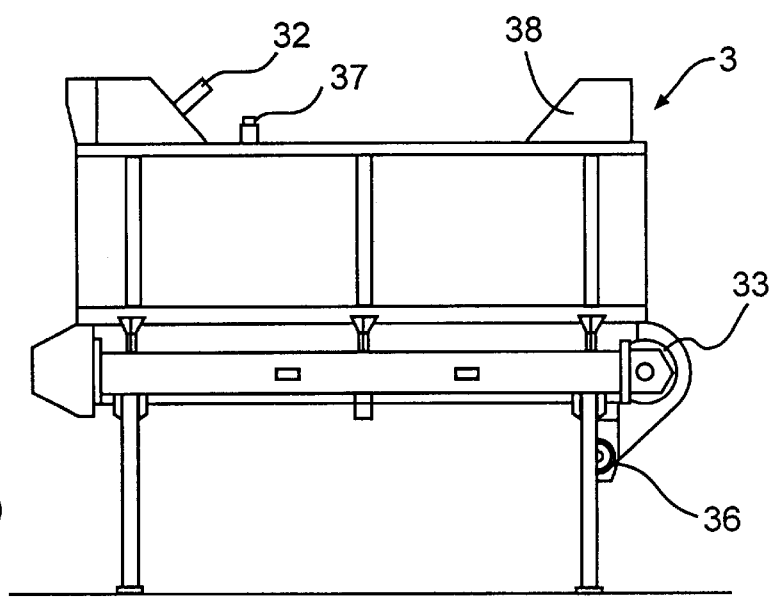
Figure 4C:
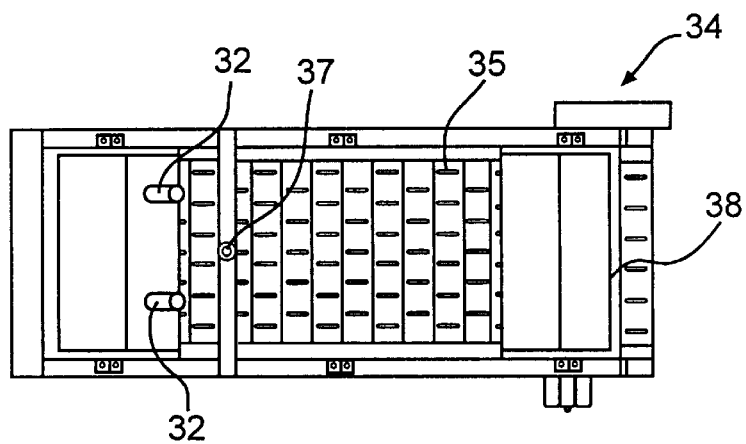

The constant rate feeder used in this invention employs a steel conveyor having staggered slab-like protrusions mounted thereon and has a hopper which has a trapezoidal structured shape in which the bottom hopper material exit side is larger in size than the top hopper material inlet opening. A constant rate feeder with an inverse triangular shaped hopper will suffer from a problem of the crushed material jamming the metering feeder exit. In contrast, a hopper having a trapezoidal structure will not block the exit of the feeder, thereby permitting a stable and long continuous operation. The main parts of the feeder 3 are illustrated in FIGS. 4a, 4b, and 4c. FIG. 4(a) is a front view; FIG. 4(b) is a side view; FIG. 4(c) is a conveyor section. Hopper 31 of the feeder 3 has a trapezoidal shape, the lower sections of which are larger. Beneath hopper 31 is provided a conveyor 34. On top of the conveyor 34 are provided slab-like protrusions 35.

If, in a constant rate feeder, the balance between the incoming and outgoing amounts of the shredder dust crushed material is lost and the amount of the outgoing material drops below that of the incoming material, the contents will begin to overflow the walls of the feeder and run to the outside. In order to safeguard against such a condition, a hood 38 to prevent the overflow of the contents is provided, along with a detector sensor 37. The hood 38 can prevent the contents from overflowing. Detector sensor 37 detects the contents when it reaches above a certain level within the feeder and gives a warming signal. The warning signal may be a red (flashing) rotating lamp or a warning sound. In response to the warning signal, a step is taken so as to temporarily halt the incoming stream amount to the feeder.

After passing the second and third crushers, the crushed material becomes finer falling to about 7–9 mm in size. As the size of the crushed material reaches about 7–9 mm, the separated copper becomes free of any adhering material and achieves a high purity. Since copper was originally part of a copper cable covered with an insulator such as polyvinyl chloride, the covering polyvinyl chloride adhering to the copper has created problems in the past in terms of purity with respect to resource recycling and recovering the copper from shredder dust. The second and third crushers are structurally similar to the first crusher except that the opening sizes of their grids provided beneath the crusher is different.

The crushed material leaving the third crusher is transported by conveyor to a feeder B and therefore transported to separation air table A and vibrating screen A. While separation air table A fluidizes the crushed material by having air or like gas blown from beneath the table, the crushed material is transported to vibrating screen A. The dimensions of the vibrating screen A in the direction the material moves forward is larger so that the crushed material being transported by vibration begins to separate, depending on the difference in specific weight. Materials with a higher specific weight are collected towards the front of the table, that is in the forward direction of the crushed product. This step mainly separates copper.

After the separations and recovery of copper on vibrating screen A, the crushed material residue is a mixture of unrecovered copper, aluminum, plastic waste, tire waste, pebbles, glass waste and so on. Magnetic drum B is used to further separate and recover iron. The remainder is then crushed by a fourth crusher. Underneath the crusher is provided a 4 mm-opening lower grid. The fourth crusher is basically similar to the first-to-third crushers, except for having somewhat lower capacity. The material crushed to 4 mm or less is sorted according to its specific weight on the separation air table B and is separated and recovered as copper, aluminum, and others. The remainder is collected in an external container box by a cyclone type main dust collector.

The separation air table B and vibrating screen B used herein are in principle similar to those of the separation air table A and vibrating screen A. The product exit of the separation table B is provided with a built-in head so as to allow air to be blown up from below for separation of the crushed material by the difference in specific weight. A material with a higher specific weight is collected toward a higher position of the table and a lower specific weight material is collected towards the lower table portion. In this manner, separation table B separates and recovers copper, aluminum, and other materials. Part of the other materials is returned to the fourth crusher. The residue is transported to vibrating screen B. Vibrating screen B is a screen which vibrates vibrates up and down and left to right; there are installed three screens with different sizes. Vibration causes the crushed product to be separated based on the difference of specific weight. This step removes hairy copper wire and dense dust. The dense dust is a general name for a mixture of plastic waste, tire waste, pebble, glass waste, and the like. Passing through the fourth crusher reduces the shredder dust into a cube-like configuration with each dimension being 4 mm in size. This operation now makes it possible to separate and recover fine copper wire even when it is hairy copper wire, and so on.

The other materials are accumulated in an external container box by a cyclone type main dust collector. Air exhaustion from the cyclone main dust collector is carried out through a bag filter. The accumulated dust then is called a fluffy dust. The fluffy dust is made up of a variety of fibrous and other materials. Combusting the fluffy dust leaves behind silica, aluminum, and the like. What characterizes the fluffy dust is that the amount of chlorine contained therein is low. While the conventional shredder dust contains at least 3% by weight of chlorine, the fluffy dust of this invention contains a low level of chlorine at 0.34–0.71% by weight. This means that the fluffy dust can become a high colorific, good quality, fuel material.

Most of the polyvinyl chloride covering the copper wire, as cut transversely into ring form, is not recovered in the light weight collected dust fraction or in the fluffy dust, but is accumulated in the dense dust fraction, along with tire waste, wood waste, other plastic waste, pebble. As a result, the chlorine content of the fluffy dust in the collected dust is far lower than that of the original material. The collected dust with the reduced chlorine content can be mixed with other industrial waste, called "receptors" (for example, papermaking sludge containing a large amount of water and aluminum) which facilitates fuel production, thereby opening a route to the manufacture of a reduced chlorine charcoal briquette fuel.

Thus the present invention is characterized in that 1) shredder dust is crushed by a crusher having square blades; 2) a high capacity vibrating table is provided as a transport table underneath each crusher so as to solve any jamming problems within the table caused by the crushed material; 3) a precise iron removal step is provided; 4) a stainless steel removal process is provide; 5) non-ferrous metal separating steps are provide such as an automatic non-ferrous separator, an air separation table, and the like; 6) a constant rate feeder having a trapezoidal hopper is provided which solves jamming problems; 7) a clever combination of steps of comminuting shredder dust for a plurality of times and metal separation recovery steps, and the like. As a result, it is now possible to recover valuable metals from shredder dust, which previously as collected, has been disposed of at a final disposal facility, and the recovered copper and aluminum are of high purity, free of any adhering materials, which process can very easily facilitate a resource recycling.

In addition, another characteristic effect of this invention is the increased utility value of the collected dust which amounts to 50% by weight or greater of the shredder dust, that is the fluffy dust. Previously, combustion of a chlorine-containing material has generated toxic dioxin so that the combustion of a chlorine containing material has created a serious environmental problem. In this view, the collected dust, that is the fluffy dust in this invention, having a low chlorine content at 0.36–0.71% by weight, now offers a possibility of using such fluffy dust as a fuel. It becomes also possible to melt the slag obtained after combustion of the fluffy dust and eject it from a nozzle, thereby generating rock wool. Rock wool can be used in sound insulating walls along highways. At the same time, aged sound insulating walls can now be scrapped and processed by an automobile shredder, thereby generating a large recycle "ring."

The present invention now makes it possible to recover valuable materials from shredder dust. The material to be recovered and its quantitative relationships vary, depending upon the raw material itself processed by the shredder, but in general, the following yields were observed: 7–10% by weight of iron, 3 . 5% by weight of copper, 4–5% by weight of aluminum, 25% by weight of dense dust such as rubber, plastics, glass, wood, pebble, and the like, and about 55–61% by weight of collected dust that is fluffy dust.

The present invention is an epoch-making invention which separates and recovers valuable materials from shredder dust which heretofore has been disposed of, thereby opening a new possibility for resource recycling. Shredder dust, which has been discarded, now permits separating and recovering not only iron, but also high purity copper and high purity aluminum. It also can provide a low chlorine content fluffy dust, which can be used as a fuel, and on combustion, produces a combustion slag that can be melt shaped into rock wool.

What is claimed is:

1. A process for recovering combustible materials from a shredder dust which includes chlorine-containing materials, which process comprises:

(a) crushing the shredder dust to reduce the particle size thereof in a stepwise manner to a predetermined maximum particle size by passing the shredder dust serially through a plurality of crushers to provide a series of crushed products each having a particle size smaller than that of the preceding crushed product, and separating metals from each of the crushed products;

(b) transporting the crushed product having said predetermined size to a separation air table and fluidizing the crushed product thereon with air blown from beneath the table to separate a fluffy dust form a heavier residue;

(c) pneumatically transporting the separated fluffy dust to a dust collector; and (d) collecting in the dust collector a combustible fluffy dust having a chlorine content lower than that of the shredder dust.

2. A shredder dust treatment process comprising the following steps:

(a) a step of executing a first crushing of a shredder dust;

(b) a step of separating and recovering metals from the resulting first crushed product;

(c) a step of a second crushing of the remaining first crushed product;

(d) a step of separating and recovering metals from the resulting second crushed product;

(e) a step of executing a third crushing of the remaining second crushed product;

(f) a step of transporting the resulting third crushed product to a separation air table and fluidizing the crushed product on the table with air to separate thereform a fluffy dust, and pneumatically transporting the separated fluffy dust to a dust collector for recovery; and (g) a step of separating and recovering non-ferrous metals and non-metals contained in the third crushed product.

3. The shredder dust treatment process as set forth in claim 1 or claim 2, which comprises crushing the shredder dust by a crusher having square blades.

4. The shredder dust treatment process as set forth in claim 2, wherein the step of separating and recovering metals from the first crushed product includes the following steps:

(a) separating and recovering steel by a hanging magnet;

(b) separating and recovering steel by a magnetic drum;

(c) separating and recovering non-ferrous metals by a non-ferrous separator; and (d) separating and recovering metals using a metal detector.

5. The shredder dust treatment process as set forth in claim 2, wherein for feeding the shredder dust or any of the crushed products thereof, there is used a steel conveyor provided with alternately mounted slab-like protrusions.

6. A shredder dust treatment process as set forth in claim 2, wherein for feeding the shredder dust or any of the crushed products thereof, there is used a feeder equipped with a hood which prevents an overflow of the contents from the feeder and a detector sensor which detects an abnormal content level in the feeder.

7. A shredder dust treatment process as set forth in claim 2, wherein in step (g) a part of the separated components of said crushed product are returned to the third crushing step.

* * * * *